United States Patent
Kadashevich

(10) Patent No.: US 7,636,918 B2
(45) Date of Patent: Dec. 22, 2009

(54) METHOD AND SYSTEM FOR TRACKING MEMORY USAGE BY SOFTWARE AGENTS

(75) Inventor: A. Julie Kadashevich, Tyngsboro, MA (US)

(73) Assignee: International Business Machines Corporation, Armonk, NY (US)

(*) Notice: Subject to any disclaimer, the term of this patent is extended or adjusted under 35 U.S.C. 154(b) by 794 days.

(21) Appl. No.: 10/824,001

(22) Filed: Apr. 14, 2004

(65) Prior Publication Data

US 2005/0235054 A1 Oct. 20, 2005

(51) Int. Cl.
G06F 9/46 (2006.01)
G06F 15/173 (2006.01)
G06F 11/00 (2006.01)

(52) U.S. Cl. .............. 718/105; 718/100; 718/104; 709/223; 709/224; 709/225; 714/1; 714/2; 714/47

(58) Field of Classification Search .............. 718/100, 718/102, 103, 104, 105, 1, 101; 709/220, 709/221, 222, 223, 224, 225, 202; 714/1, 714/2, 5, 7, 47

See application file for complete search history.

(56) References Cited

U.S. PATENT DOCUMENTS

| | | | | |
|---|---|---|---|---|
| 6,054,987 A * | 4/2000 | Richardson | ............... | 715/734 |
| 6,144,739 A * | 11/2000 | Witt et al. | ............... | 380/2 |
| 6,459,683 B2 * | 10/2002 | Busuioc et al. | ............... | 370/270 |
| 6,691,067 B1 * | 2/2004 | Ding et al. | ............... | 702/186 |
| 6,732,359 B1 * | 5/2004 | Kirkpatrick et al. | ............... | 718/102 |
| 6,738,757 B1 * | 5/2004 | Wynne et al. | ............... | 707/3 |
| 6,871,345 B1 * | 3/2005 | Crow et al. | ............... | 717/175 |
| 6,938,254 B1 * | 8/2005 | Mathur et al. | ............... | 718/104 |
| 6,975,595 B2 * | 12/2005 | Peterson | ............... | 370/252 |
| 7,043,726 B2 * | 5/2006 | Scheetz et al. | ............... | 718/1 |
| 7,155,715 B1 * | 12/2006 | Cui et al. | ............... | 717/177 |
| 7,307,954 B1 * | 12/2007 | Strandberg et al. | ............... | 370/235 |
| 2005/0010578 A1 * | 1/2005 | Doshi | ............... | 707/100 |

* cited by examiner

*Primary Examiner*—Lewis A Bullock, Jr.
*Assistant Examiner*—Abdullah Al Kawsar
(74) *Attorney, Agent, or Firm*—David A. Dagg

(57) ABSTRACT

A method and system for tracking memory usage by software agents operating in a computer system is disclosed. A memory resource tracking application is executed in the system. When an operating software agent is detected, a determination is made about the memory consumed by the running agent. Measurements are made at periodic intervals to determine if the agent has ended. When the agent has ended, all memory allocations associated with the agent are added together to arrive at a peak memory usage for the agent.

20 Claims, 10 Drawing Sheets

| AGENT ID | THREAD PRESENCE | START TIME | END TIME | STATUS | SEVERITY | RESOLUTION |
|---|---|---|---|---|---|---|
| 010 | 0 | | | | | |
| 008 | 1 | | | | | |
| 006 | 0 | | | | | |
| 003 | 0 | | | | | |
| 001 | 0 | | | | | |
| | | | | | | |
| | | | | | | |
| | | | | | | |
| | | | | | | |

| AGENT ID 622 | |
|---|---|
| THREAD ID | CPU CYCLES USED |
| 005 | 1,000 |
| 006 | 200,000 |
| 007 | 15,000 |
| 008 | 1,000,000 |

| AGENT ID 622 | |
|---|---|
| THREAD ID | PEAK USAGE |
| 001 | 1.2 |
| 002 | 2.5 |
| 003 | 6.0 |
| 004 | 10.1 |

621, 624, 626

METHOD AND SYSTEM FOR TRACKING MEMORY USAGE BY SOFTWARE AGENTS

BACKGROUND OF THE INVENTION

Management and workflow collaboration software systems are used by organizations to maintain the efficiency of workforces. Among other things, these systems, herein referred to as enterprise systems, allow employees to communicate, obtain information, requisition products and services, generate documents, and perform online training. Management systems may also connect portions of an organization that are separated geographically. As a result, management systems are often spread across multiple servers coupled to the network. The distributed nature of management systems along with the requirement that they perform numerous operations simultaneously makes them very large and complex.

Adding to the complexity of management systems is the fact that many of these systems have evolved over time. This evolution has largely been driven by customer needs and has resulted in rather basic management systems evolving into the large, complex ones predominant today. In addition, users must be able to write their own applications to extract maximum utility from management systems. The combination of old/new software-executable instructions and customer developed software instructions may produce operating environments that are difficult to troubleshoot. For example, an enterprise system may be executing hundreds or thousands of software agents as a matter of normal operation. A software agent as used herein refers to any self-contained potentially adaptive software application and as such is an executable sequence of instructions. Software agents can be short lived, i.e. having lifetimes of less than a second, or can be long-lived having lifetimes measured in hours or days. Furthermore, software agents may need to operate according to a schedule. If a particular software agent is not operating at the appropriate time, it may be due to either a problem with the scheduled agent, a problem with an agent currently running, or a problem with software processes that schedule agents. Identifying the exact cause of late agents using the prior art is thus problematic. Software agents may also consume system resources while operating. Examples of resources consumed by agents are, but not limited to, system memory, CPU bandwidth, disk input/output operations, database opens, document creation, and network traffic.

Prior art systems and methods for monitoring agent activity may not easily identify problematic agents because there is no apriori mechanism for identifying when agents may become problematic. Furthermore, prior art tools may not isolate problematic agents because they rely on sampling agents at discrete time intervals.

There exists a need for systems and methods for identifying agents that may become problematic before they actually cause a problem. Furthermore, there exists a need for monitoring system resources consumed by software agents. In addition, there is a need for identifying and rank ordering agents causing problems so that system resources can be adaptively managed.

SUMMARY OF THE INVENTION

The preferred embodiments of the present invention are directed to memory resource monitoring methods that identify memory resource intensive agents. The methods also include ranking these agents and providing corrective actions for them.

In accordance with an aspect of the invention, a method for monitoring memory usage by a software agent executing in a computer system is provided. A resource tracking function for monitoring information associated with the software agent is started. Then a computer-readable data structure for storing information about the agent is created. A process operating on the system, and to which the agent is operatively associated, is identified before determining memory usage data for the agent and storing it in the previously created data structure.

If the method identifies the process as being a non-HTTP process, determining memory usage data for the agent may further include: creating a thread list for monitoring threads associated with the agent, identifying a thread associated with the agent, adding the identified thread to the thread list, determining a memory allocation associated with the identified thread, and computing a peak memory usage for the agent using the determined allocation.

In contrast, if the method identifies the process as being an HTTP process, determining memory usage data for the agent may further include: identifying HTTP threads operating in the system where each thread can have one of many types of agents associated with it, generating an agent thread list to facilitate identifying the types of agents, identifying which of the agent types is operating on each of the HTTP threads, associating those of the agent threads that are running the agent together to produce a related agent set, determining memory usage for each thread in the related agent set and combining the memory usage for each thread in the related agent set to produce a total memory consumption for the agent.

In accordance with another aspect of the invention, a computer program product having machine-readable instructions thereon for instructing a processor to perform a method for identifying memory usage information associated with a software agent operating in a computer system is provided. The computer program product may include instructions for initiating resource tracking instructions for monitoring information associated with the software agent, instructions for generating a computer-readable data structure residing in computer-accessible memory for storing memory usage information associated with the agent, instructions for determining the memory usage information, and instructions for storing the memory usage data in the computer-readable data structure.

In accordance with still another aspect of the invention, an apparatus for monitoring operation of a software agent is provided. The apparatus may include a processor executing machine-readable instructions for starting a resource tracking function for monitoring and processing information associated with a software agent operating in connection with the apparatus, and a memory communicatively associated with the processor for storing information about memory usage of the agent in a data structure.

The foregoing and other features and advantages of the system and method for monitoring memory consumption by software agents operating in a system will be apparent from the following more particular description of preferred embodiments of the system and method as illustrated in the accompanying drawings in which like reference characters refer to the same parts throughout the different views.

BRIEF DESCRIPTION OF THE DRAWINGS

FIGS. 5A-5C illustrate exemplary data structures for representing agent data and thread data in a computer-readable memory in accordance with a preferred embodiment of the present invention;

Figure 1:
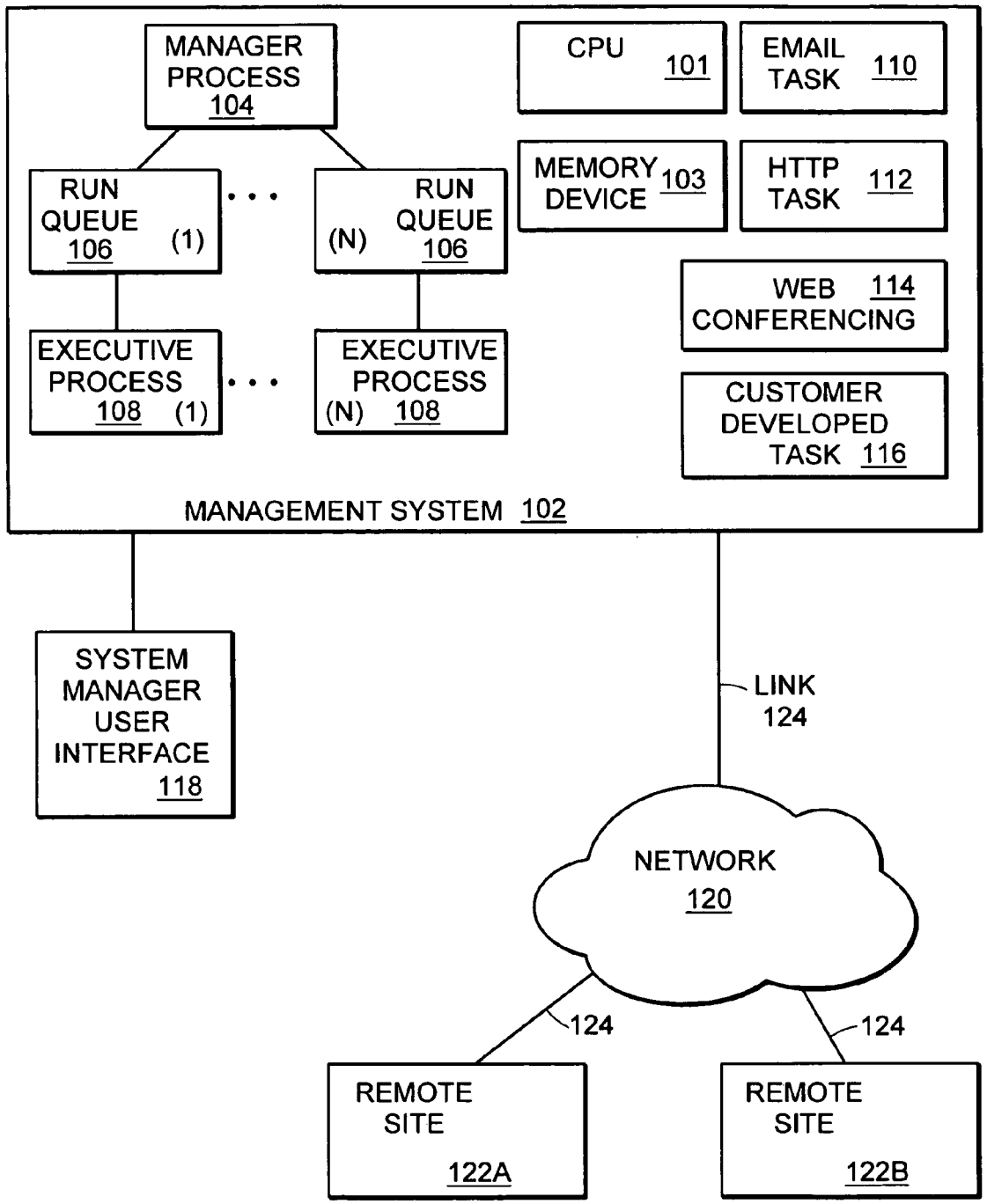
FIG. 1 illustrates an exemplary management system consistent with preferred embodiments of the present invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

While exemplary embodiments are provided, other embodiments are possible in light of the specification. Therefore, unless otherwise specified, illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems and methods. Additionally, the shapes and sizes of components are also exemplary and unless otherwise specified, can be altered without affecting the disclosed systems and methods and without departing from the spirit and scope of the invention.

Management systems such as, for example, enterprise systems handle, without limitation, electronic mail (email) receipt and distribution, access and management to intranet and Internet web sites, management of internal databases, multimedia conferencing, and online calendaring and appointment management. In addition, enterprise systems handle many other functions necessary to assist large and small organizations in operating efficiently. Management enterprise systems rely heavily on the use of software agents for managing the workflow. Agents can be generated by the enterprise system itself or by users. Agent are typically of two types, scheduled or event driven. Scheduled agents are those having a defined start time. In addition, scheduled agents may have a predetermined stop time or the stop time can be dictated by an event such as, for example, but not limited to, receipt of an interrupt or the start of another agent. In contrast, event driven agents begin upon the occurrence of a particular event rather than at a certain time. Examples of event driven agents are, but are not limited to, document creation agents, document closing agents, database opening agents, user logon processing agents, email agents activated upon receipt of a message, and web based agents.

For web based event driven agents, the most common class may be those associated with hyper text transport protocol (HTTP) processes. An HTTP process has a plurality of threads associated therewith, and in a preferred embodiment, the default number of multiple threads in an HTTP process is forty. Each thread has a unique identifier, for example an identification number, referred to as an HTTP thread ID. An HTTP environment can be multi-threaded with each HTTP thread running a single agent thus making it possible for a given agent to be running on multiple HTTP threads simultaneously. For example, in a preferred embodiment, forty copies of the same agent can be executed, or run, at the same time. An HTTP thread ID number is associated with the instance of an agent executing on the respective thread, thus making it possible to identify with which copy of an agent a given set of activities are associated. For example, identifying instances of agents using HTTP thread ID's makes it possible to determine when a specific instance of an agent started and/or ended. In the above example, a reference to the instance of the agent, such as an agent ID, consists of the agent's name along with the HTTP thread ID associated with the agent. In addition, a database entry or other parameter may be associated with the agent name and HTTP thread ID to uniquely identify and further provide details about the agent. As used herein, a thread is a program path of execution, and multi-threaded means that multiple lines of a single program can be executed simultaneously. When agents are running on multiple threads, the operating system may treat each thread as a separate and distinct process.

When numerous agents are running simultaneously, problems can occur when one or more agents fail to operate as intended. Problematic agents can be associated with the management enterprise system itself or of with user generated agents. Agents in the management system computing environment may become problematic when a new software release is implemented because of, without limitation, incompatibilities with system interfaces or user generated agents and an inability to identify a particular agent when attempting to diagnose system abnormalities. User generated agents may be problematic due to incompatibilities with operating system components, a developer's failure to understand the functionality of developed agents, security misconfigurations associated with developed agents, faulty parameters associated with developed agents, etc.

Agent failures can take many forms, however, certain failures tend to be more prevalent. Examples of common agent failures are, but are not limited to, mismanagement of system memory by agents, excessive central processing unit (CPU) usage, spawning of too many sub processes or threads, running longer than expected, failing to execute at the proper time, entering an infinite loop, and mis-applied/misused security settings. The present invention addresses agents that consume too much CPU time or that consume too much memory.

FIG. 1 illustrates an exemplary embodiment of a management system for example an enterprise management system, in accordance with the invention. The management application 100 includes management computing system 102 which includes a central processing unit (CPU) 101, a memory device 103, a manager process 104, a run queue 106, an executive process 108, an email task 110, an HTTP task 112, a web conferencing task 114, a customer developed task 116, and a system manager user interface (UI) 118. The management application 100 also includes network 120, remote site 122A and 122B, and links 124. The management computing system 102 may execute on one or more servers within a corporation, university, governmental agency, or the like. Processes running in management computing system 102 will consume CPU resources provided by CPU 101. CPU 101 is comprised of one or more processors executing machine-readable instructions obtained, at least in part, from memory device 103. Consumption is based on usage of CPU clock cycles for executing machine-readable instructions when performing functions associated with software-enabled processes. In addition, processes will consume memory to hold variables, generated data, pointers, etc. Properly operating agents should release memory when they terminate, so that other agents can make use of the newly freed memory. However, when agents do not cease operation correctly, they often fail to release blocked memory, thus adversely impacting system resources.

The manager process 104 oversees management of software agent activity within a management application 1100. In particular, the manager process 104 operates in connection with a plurality of executive processes 108 and a run queue 106. When an agent is scheduled to run, the manager process 104 places it in run queue 106. When an executive process 108 is free, the manager process 104 instructs the executive process 108 to begin processing the scheduled agent. When the executive process 108 begins operating on an agent, the agent becomes a running agent for the duration of time it is associated with executive process 108. When an agent has finished executing, the executive process 108 releases the agent thus becoming available for running a new agent.

The management computing system 102 may also include an email task 110. The email task 110 is responsible for handling all incoming and outgoing email. Agents associated with email task 110 may be scheduled agents or event driven agents. Examples of scheduled agents operating in conjunction with email task 110 may be an email checking agent. When launched, a router operating in the software delivers mail and sends an event to an agent manager indicating that new mail has been delivered to a database. If an active agent resides in that database, it is invoked.

The HTTP task 112 may run on management computing system 102. The HTTP task 112 is responsible for processing all HTTP related traffic within enterprise management application 100. The HTTP task 112 may start all threads upon its activation, or startup, in response to HTTP requests received from network 120. HTTP task 112 runs event driven agents and threads. The HTTP task 112 may further start a new agent on any running thread. As previously discussed herein, an HTTP agent in an HTTP process can run on more than one thread. In such an embodiment, knowing only a problematic agent's name is not sufficient for identifying it. Information about the thread running the problematic agent is required to positively identify the agent.

The Web conferencing task 114 is responsible for handling all audio, video and text data associated with collaborative conferencing. The Web conferencing task 114 may interact with the email task 110 and/or the HTTP task 112 when providing web conferencing capabilities to an organization. As a result, the web conferencing task 114 may utilize scheduled and event driven agents.

The customer developed task 116 may include software developed by a user of the management application 100. User developed software may take many forms and may utilize one or more scheduled or event driven agents. An example of user developed task 116 may be an order processing agent. The order processing agent may have an event driven portion that executes when a user opens an online ordering capability. Once the order is entered, a scheduled agent may operate on a predetermined cycle seeking management approvals for the order before sending it to a vendor for fulfillment.

The system manager UI 118 may include a computer display for presenting information to a system administrator. For example, the manager process 104 may detect an improperly running agent and cause a popup window to appear on the system manager UI 118. After viewing the error report, the system administrator can take corrective action.

The network 120 connects management computing system 102 to remote sites 122A and 122B. In many large corporations, there may be a headquarters and a plurality of field offices. In FIG. 1, management computing system 102 may be located within the headquarters building while remote sites 122A and 122B are located in a different city, state or country. Network 120 can be any type of data network such as a local area network (LAN), a metropolitan area network (MAN), or a wide area network (WAN). Furthermore, network 120 may utilize any network protocol, or combination of protocols, such as frame relay, packet switched, Internet protocol (IP), synchronous optical network (Sonet), asynchronous transfer mode (ATM), and the like. Links 124 are used to convey data across network 120 and may be comprised of twisted pair cable, coaxial cable, optical fiber, free-space optical links, radio-frequency (RF) links, or the like.

When executive process 108 begins processing an agent, the agent is referred to as an active, or running, agent. While active, an agent is deemed to be alive. When the agent has finished executing, either normally or via manual termination, it is deemed to be expired. If the agent is later placed in the holding queue it is referred to as a scheduled agent until it is once again processed by an executive process 108.

Figure 2:
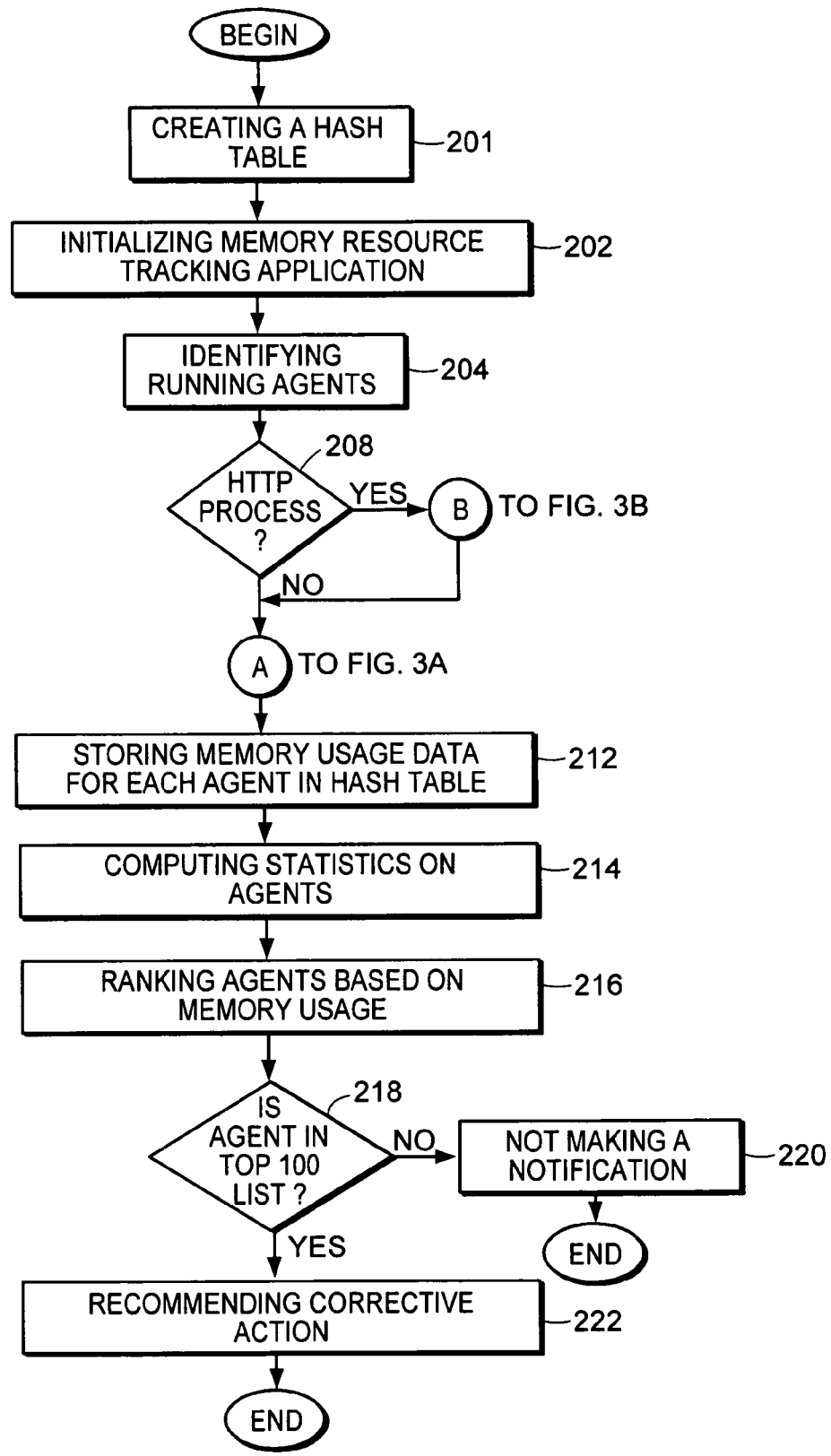
FIG. 2 illustrates an exemplary method for monitoring the memory usage of software agents operating in an enterprise application in accordance with embodiments of the invention.

FIG. 2 illustrates an exemplary method for monitoring memory resource usage by software agents operating in enterprise management application 100. A hash table is created per step 201. A hash table is a computer-readable data structure residing in memory which is used for archiving memory usage data associated with each running agent. Specifically, a hash table provides a way of mapping an object, or key, to an associated object, or value. Key refers to the part of a group of data, here information about agents, by which the data can be sorted, indexed, cross referenced, etc. The key is mapped to an array position using a hash function, where array refers to a set of items randomly accessible using a numeric index. Furthermore, the hash function is designed such that a unique key value is mapped to a unique array position.

While hash tables can take many forms consistent with embodiments of the invention, a preferred embodiment of the invention uses the thread ID as a key into the hash table. Since a thread ID uniquely identifies a given thread within the system, the key maps to a unique location within the hash table.

A memory resource tracking method is comprised of machine-executable instructions and is initialized per step 202. The method then identifies agents presently running in system 102 per step 204, before determining if an HTTP process is running per step 208.

Figure 3A:
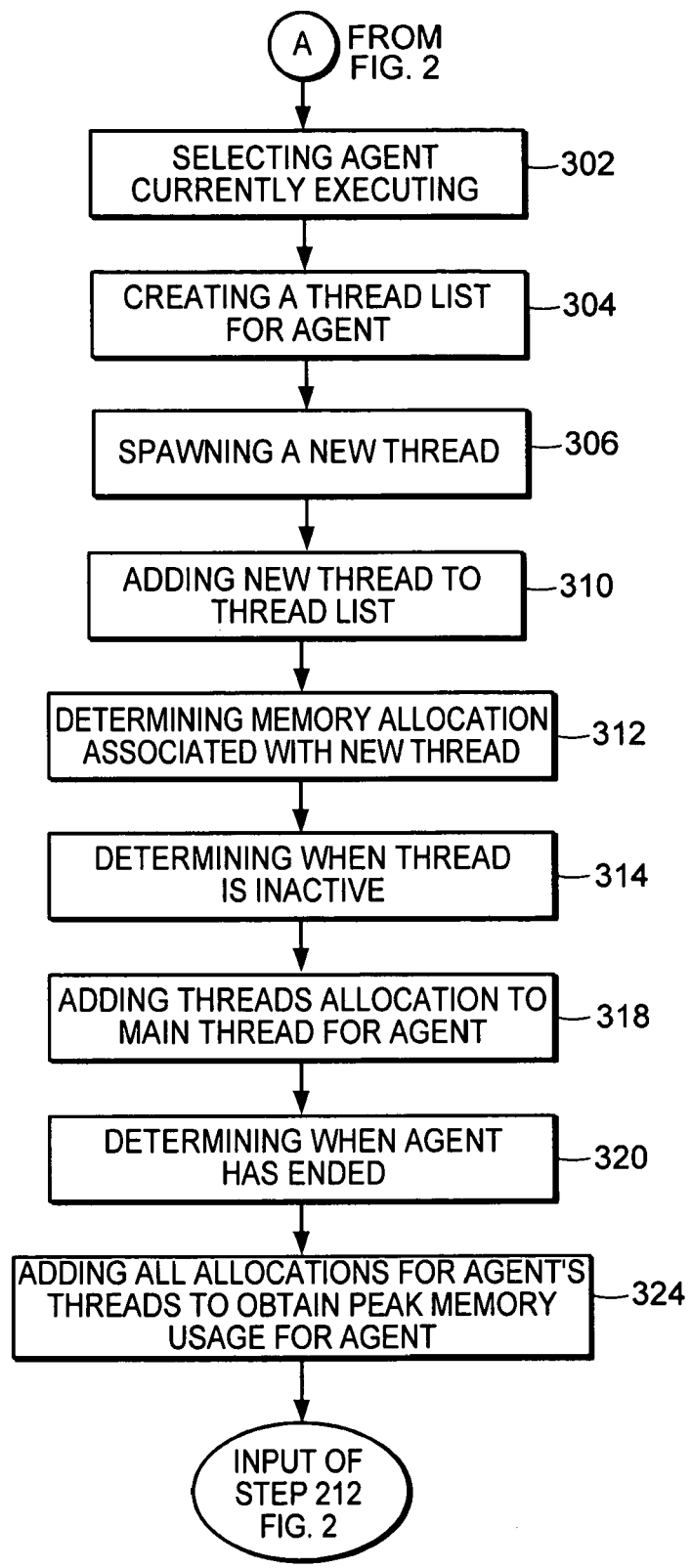
FIG. 3A-3B illustrate exemplary methods for determining memory resources consumed by software agents operating in an enterprise application in accordance with an embodiment of the invention.

If an HTTP process is not running, the method continues to FIG. 3A by way of path "A" in FIG. 2. Now referring to FIG. 3A, an exemplary method for uniquely associating memory allocations as being associated with a particular software agent is illustrated. From a pool of software agents running in system 102, an agent is selected per step 302. The selected agent may have an agent identifier (ID) associated therewith. Next, an agent thread list is created for the selected agent per step 304. A thread list contains the main, or primary, thread associated with an agent when the agent is created. The thread list is also used to retain information about other, or secondary, threads spawned by the selected agent. After creating the thread list, a new thread is spawned per step 306 and added to the thread list per step 310. The memory allocation associated with the new thread is determined and stored in the hash table per step 312. In addition to adding identifying information about the new thread and its memory allocation to the hash table, additional information about the thread can also be added. The processes associated with step 312 are embedded in the memory allocator/deallocator. In addition, memory resources are tracked as an agent executes in an iterative manner, and memory allocations may occur on different threads as the agent executes and each entry may be placed in a different location within the hash table.

After step 312, the method determines when a thread is inactive per step 314. Memory allocations associated with the new thread are added to memory allocations associated with the main thread for the software agent to obtain the total memory allocation, or footprint, for the main thread per step 318. Next, the method determines when the software agent has ended per step 320. All allocations for the agent's threads are added together to obtain a peak memory usage for the agent while it was alive per step 324. After completing step 324, the method of FIG. 3A returns to the input of step 212 of FIG. 2.

Figure 3B:
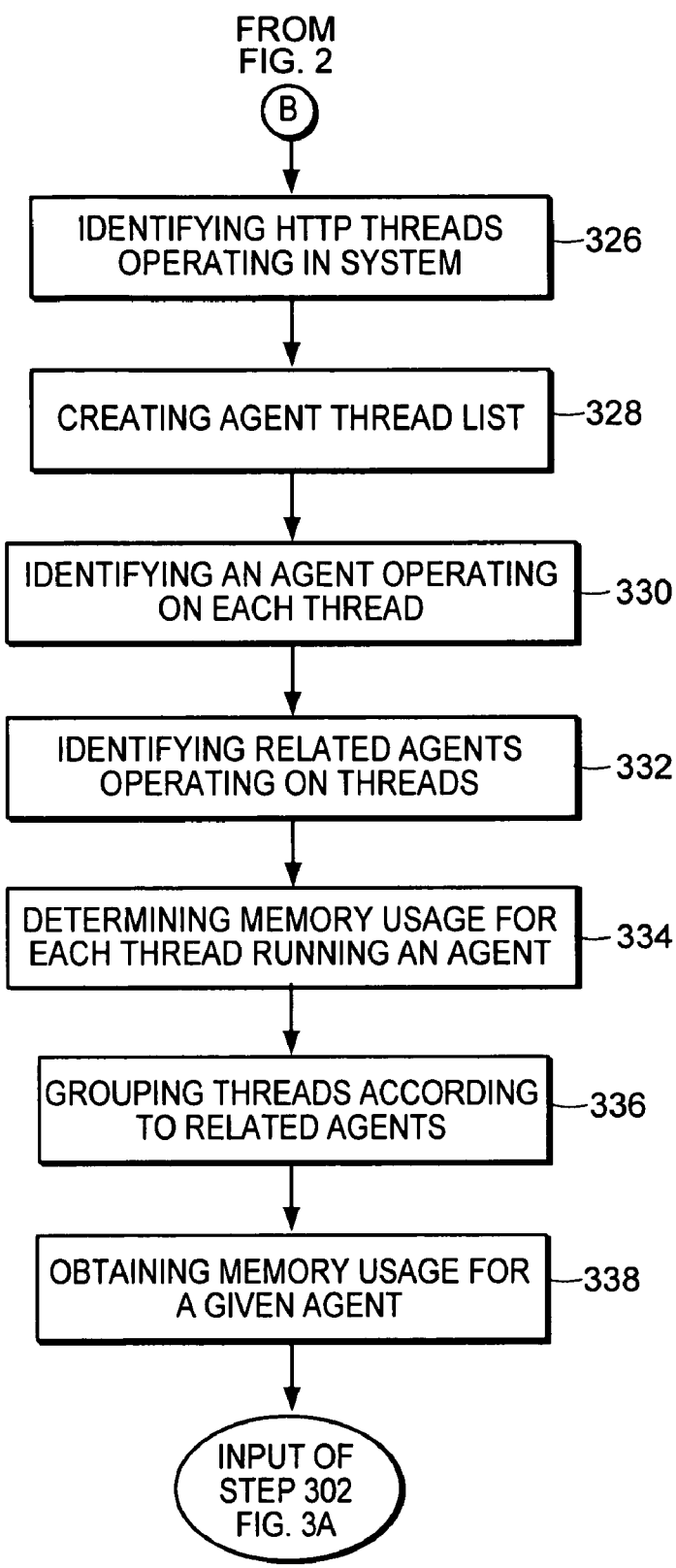

Returning now to FIG. 2, after step 204, if an HTTP process is running, the method continues to FIG. 3B by way of path "B" in FIG. 2. The method of FIG. 3B begins with identifying HTTP threads operating in system 102 per step 326. Next, an agent thread list is created per step 328. After creating the thread list, the method identifies an agent operating on each thread per step 330. As previously discussed herein, an HTTP process may have numerous threads, each having an agent operating therewith. After identifying agents, the method determines which agents are related per step 332. The term related agents is used to denote instances where a particular agent is simultaneously running on more than one thread in an HTTP environment. Memory usage for each thread running an agent is determined per step 334. Then the threads, along with the respective memory usages are grouped on the basis of related agents per step 336. Memory usage associated with all instances of a given agent is determined per step 338. After determining memory usage for an agent, the method of FIG. 3B returns to the output of step 208 in FIG. 2.

Again, returning to FIG. 2, if agents are running, memory usage information associated with them is stored in the open hash table per step 212. Statistics are computed based on parameters associated with running agents per step 214. Agents are then ranked, or rank ordered, according to memory usage per step 216. In a given system 102, hundreds or thousands of agents may be running at any given time. In many embodiments of the invention, a system administrator reviews and acts on the agent data; therefore, only a subset of running agents will be reported to the system administrator. In a preferred embodiment of the invention, a determination is made as to whether an agent is among the top 100 users of memory resources per step 218. If the agent is not among the top 100, a notification is not made for that agent per step 220. In contrast, if the agent is among the top 100 in terms of memory usage, information about the agent along with recommendations for corrective actions for mitigating the agent's memory usage are reported to a display device such as system manager UI 118 per step 222.

Figure 4:
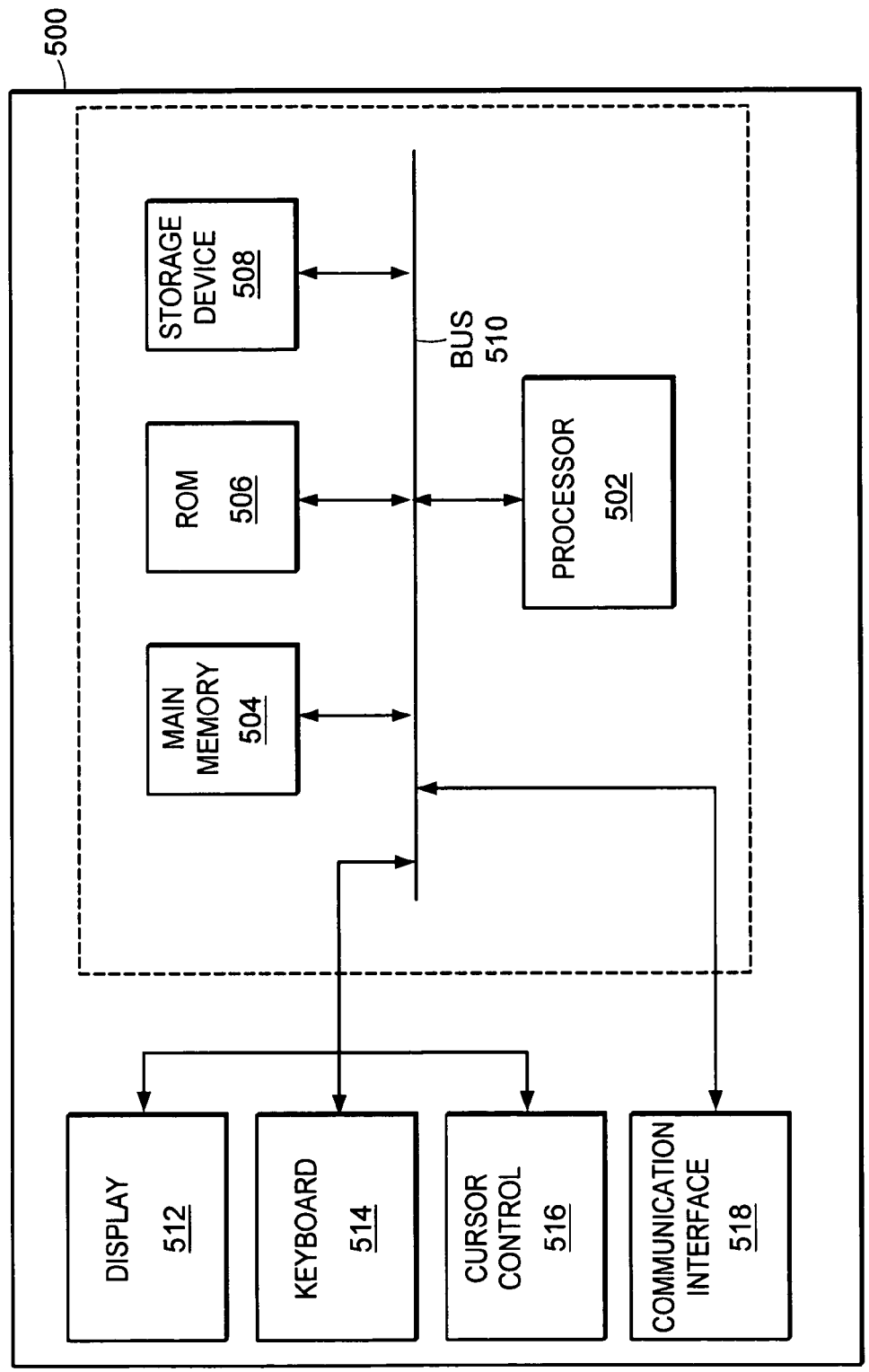
FIG. 4 illustrates an exemplary architecture for a general-purpose computer capable for implementing aspects of the invention in accordance with a preferred embodiment of the present invention.

FIG. 4 illustrates an exemplary general-purpose computer architecture useful for practicing embodiments of the invention. General-purpose computer 500 may be comprised of a processor 502, main memory 504, read only memory (ROM) 506, storage device 508, bus 510, display 512, keyboard 514, cursor control 516, and communication interface 518. Processor 502 may be any type of conventional processing device that interprets and executes instructions. Main memory 504 may be a random access memory (RAM) or a similar dynamic storage device. Main memory 504 stores information and instructions in machine-readable form for execution by processor 502. Main memory 504 may also be used for storing temporary variables or other intermediate information during execution of instructions by processor 502. ROM 506 stores static information and instructions for processor 502. It will be appreciated that ROM 506 may be replaced with other types of static storage devices such as programmable ROM, erasable programmable ROM, and the like. Data storage device 508 may include any type of magnetic or optical media and its corresponding interfaces and operational hardware. Data storage device 508 stores information and instructions for use by processor 502. Bus 510 includes a set of hardware lines (conductors, optical fibers, or the like) that allow for data transfer among the components of computer 500.

Display device 512 may be a cathode ray tube (CRT), liquid crystal display (LCD), or the like, for displaying information to a user. Keyboard 514 and cursor control 516 allow the user to interact with computer 500. Cursor control 516 may be, for example, a mouse. In an alternative configuration, keyboard 514 and cursor control 516 can be replaced with a microphone and voice recognition means to enable the user to interact with computer 500.

Communication interface 518 enables computer 500 to communicate with other devices/systems via any communications medium. For example, communication interface 518 may be a modem, an Ethernet interface to an IP network, or a printer interface. Alternatively, communication interface 518 can be any other interface that enables communication between computer 500 and other devices or systems.

By way of example, a computer 500 consistent with the present invention provides a management computing system 102 with the ability to monitor scheduled and running agents on remote sites 122A and 122B via network 106. Computer 500 performs operations necessary to complete desired actions, such as computing a total CPU time for an agent and storing it in a hash table as shown in FIG. 5A, in response to processor 502 executing sequences of instructions contained in, for example, memory 504. Such instructions may be read into memory 504 from another computer-readable medium, such as a data storage device 508, or from another device (not shown) via communication interface 518. Alternatively, hardwired circuitry may be used in place of or in combination with software instructions to implement the present invention. Thus, the present invention is not limited to any specific combination of hardware circuitry and software.

FIGS. 5A-5C illustrate exemplary computer-readable data structures, or records, useful for storing information associated with monitoring memory and CPU resources consumed by software agents and threads associated therewith. In FIG. 5A, Agent data structure 600 is comprised of an agent ID field 602, a thread presence 604, a start time field 606, an end time field 608, a status field 612, a severity field 614, and a resolution field 616. Agent ID field 602 may contain information useful for uniquely identifying agents. In an embodiment of the invention, agents may be identified using a unique number. Data presented in agent data structure 600 may be arranged using any of the fields; however, in most instances agents will be ordered by agent number or by their adverse impact on enterprise management application 100. For example, agent 010 of FIG. 5A may be the agent consuming the greatest amount of CPU time and agent 001 may consume the least amount of CPU time.

Thread presence 604 may be a flag denoting the existence of threads other than the main thread associated with an agent. A value for thread presence may reference another data structure such as a thread list data structure for storing additional information.

Start time field 606 and end time field 608 may contain the start time and completion time for a given agent, respectively. Status field 612 may contain information about the current status of an agent. For example, status field 612 may contain a flag where the value of the flag indicates whether the agent is currently alive or expired.

Alternatively, status field 612 may contain color codes such as red for an agent greatly exceeding an allocated system resource, such as a memory budget, yellow for an agent that is beginning to exceed a memory budget, and green for agents operating within a memory budget.

Severity field 614 may contain a text field providing possible reasons why an agent is exceeding a memory budget. For example, severity field 614 may indicate to a system administrator that a particular agent is currently executing in an infinite loop and that manually terminating the agent is the only way to release memory resources being utilized. Resolution field 616 may contain instructions for instructing a system operator on how to terminate a problematic agent.

Additional fields may be added to the data structure of FIG. 5A without departing from the spirit of the invention. For example, fields for CPU time and memory usage may be added. Furthermore, data structures associated with FIG. 5A may be distributed across multiple memory devices, geographic locations, etc. depending on particular implementations of enterprise management application 100.

FIG. 5B illustrates an exemplary data structure useful for storing information about threads associated with an agent operating in connection with enterprise management application 100. Thread data structure 621 may be comprised of an agent identification field 622, a thread ID field 624, and a peak usage field 626.

Agent identification field 622 may identify an agent having threads identified in thread ID field 624. Thread ID field 624 may contain information uniquely identifying each thread associated with a given agent. Threads included in thread ID list may make up a thread list or a thread group list.

Thread data structure 621 is exemplary in nature and can be modified depending on the needs of enterprise management application 100. Peak usage field 626 may indicate the amount of memory consumed by particular threads during their respective lifetimes. FIG. 5C illustrates a CPU time data structure 623 useful for storing operating information associated with threads. CPU time data structure contains agent identifier field 622, thread identifier field 624, and CPU cycles used field 628. Agent identifier field 622 identifies the agent having the threads denoted in the thread identifier field 624. CPU cycles used field 628 provides the number of CPU cycles consumed by a given thread. CPU cycles used field 628 may contain a raw count indicating the number of CPU cycles consumed by a given thread, or it may provide a time value or percentage of total CPU resources consumed by a thread.

Figure 6A:
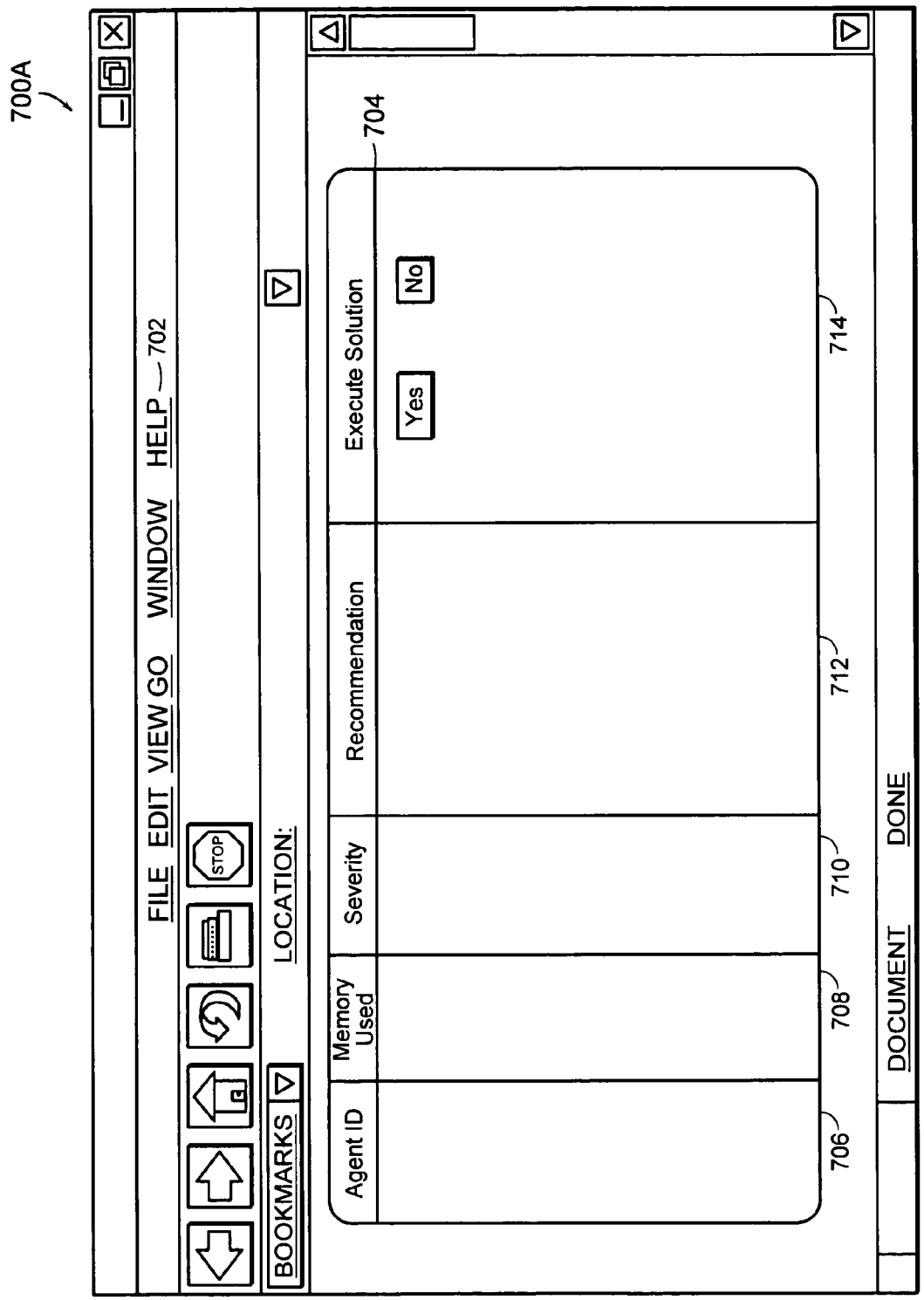
FIGS. 6A-6D illustrate exemplary user interfaces for providing agent data and thread data to a user in accordance with a preferred embodiment of the present invention.

FIG. 6A illustrates an exemplary user interface useful for providing information to a user. For example, Data display 700A may be provided to a system administrator using system manager UI 118. Data display 700A may comprise tool bar 702, and a reporting table 704, comprising fields for agent ID 706, memory used 708, severity 710, recommendation 712 and execute solution 714. Data display 700A may further be displayed on a cathode ray tube (CRT), flat panel display, or the like in a human-readable form, and the data can be displayed using a conventional browser such as Mozilla™ or Internet Explorer™.

Tool bar 702 may provide drop down menus for facilitating access to commonly used functions. For example, clicking on File using a pointing device, such as a computer mouse, may cause a drop down menu to appear. Choices in the drop down menu may allow a user to print the display, save the display to a file, open a new display window, etc.

Reporting table 704 may frame information displayed to a user in order to make displayed information easier to understand. Agent ID 706 may contain information identifying specific agents such as agent ID field 602 values used in connection with FIG. 6A. Agents reported on data display 700A may be ordered according to severity, agent ID, number of threads, etc. Memory used 708 may contain information regarding the amount of system memory used by a particular agent. Severity 710 may indicate the impact a particular agent is having on enterprise management application 100. Recommendation 712 may contain a text field providing the user with an explanation of the problem along with a recommended course of action. Execute solution 714 may consist of a radio button that can be activated using a pointing device such as a mouse. When activated, execute solution 714 implements the recommended course of action contained in recommendation 712.

Figure 6B:
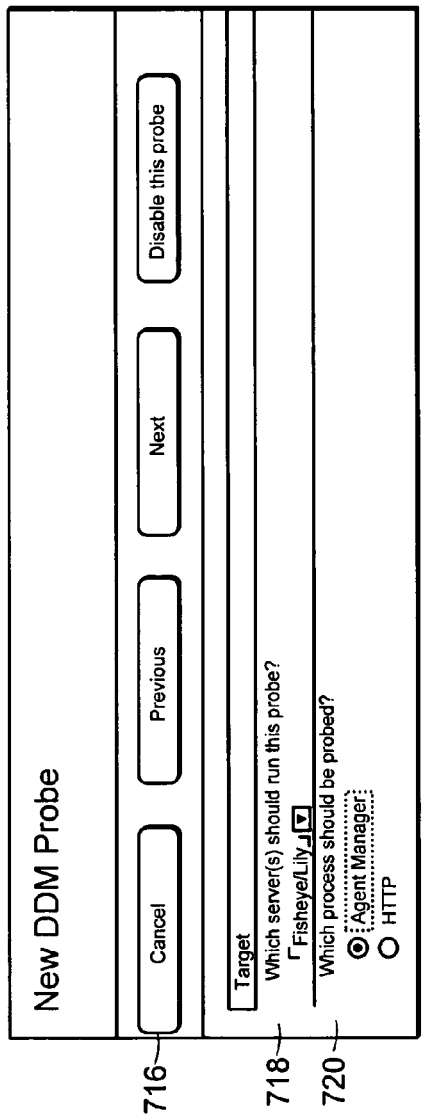

FIG. 6B contains an exemplary data display 700B containing a user interface for accepting user inputs for display of agent data. Action buttons 716 provide the user with one-click means for accessing common functionality such as canceling a requested action, going back to a previous screen or display, continuing in sequence to a subsequent display or disabling an agent probe. Target selector 718 provides the user with a means for selecting a target computer which is the device from which memory usage and/or CPU time data statistics will be gathered. Target computers may be denoted by a name, network address, association with a particular agent of interest, etc. Process selector 720 provides a user with a means for selecting a process to be probed. In FIG. 6B the user has predetermined choices of Agent Manager or HTTP or any other process capable of running an agent application or other type of machine-executable instructions; however, process selector 720 can also be configured to allow a user to enter the name of any process using a keyboard, microphone, or other input means known in the art.

Figure 6C:
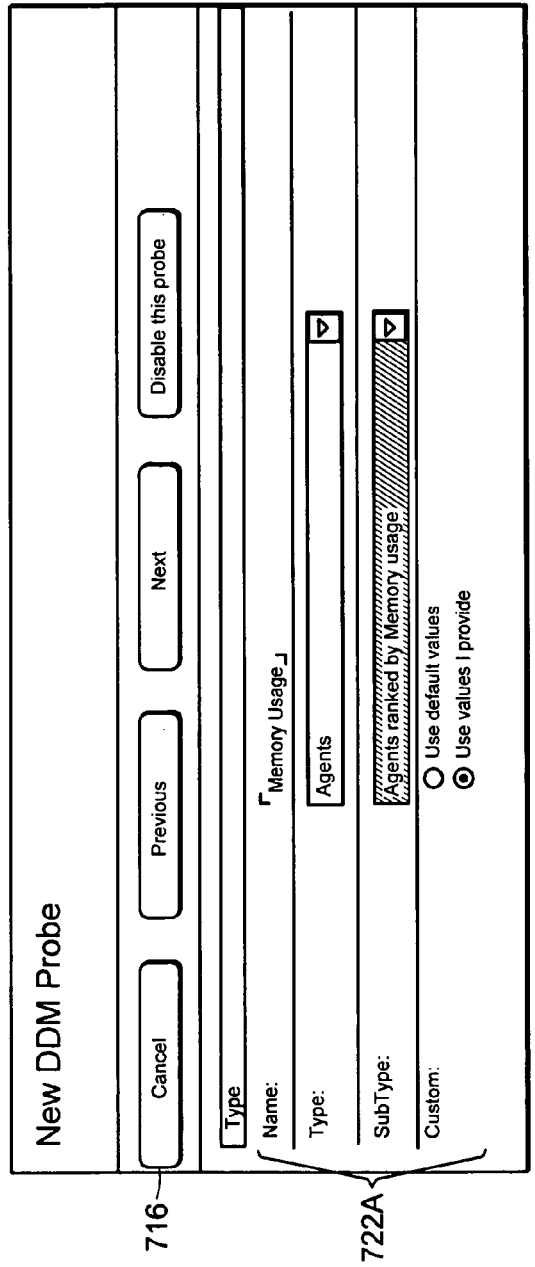

FIG. 6C contains an exemplary data display 700C containing a user interface for accepting user input data regarding agent monitoring. Data display 700C includes action buttons 716 as shown and described in connection with FIG. 6B. Type window 722A provides a user with means for selecting the type of agent operation to be run, such as "agents ranked by memory usage" along with other parameters relevant thereto. For example, a user can choose among various criteria for controlling how agent data is displayed such as by CPU usage, memory usage, or length of run time.

Figure 6D:
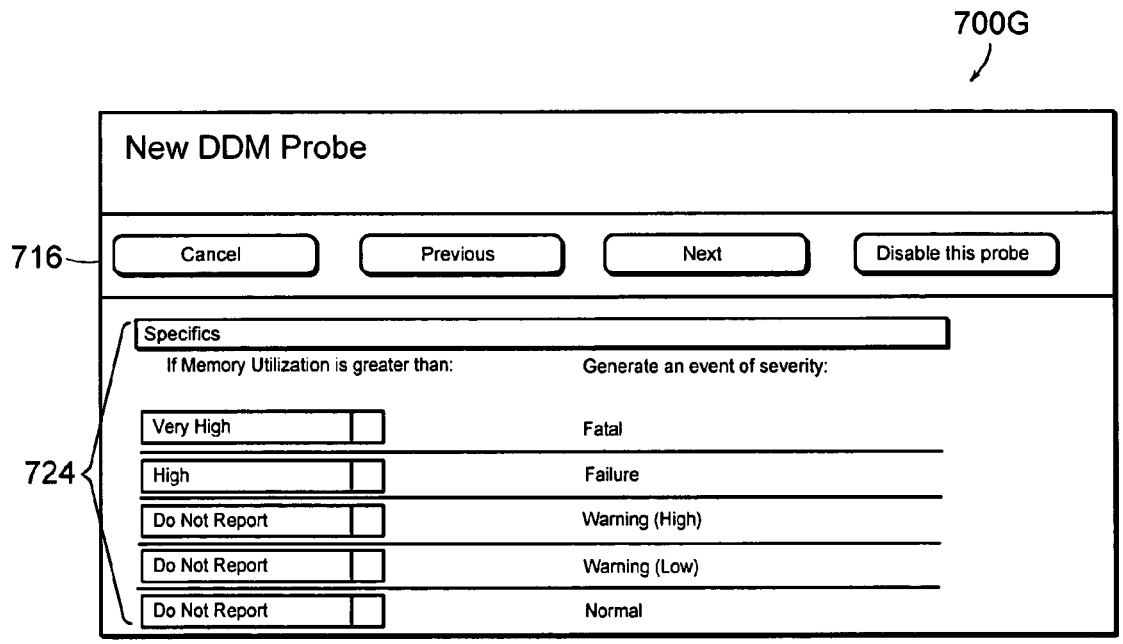

FIG. 6D contains an exemplary data display 700D containing a user interface for allowing a user to specify the severity associated with various types of agent behavior. Data display 700D includes action buttons 716 as described in connection with FIG. 6B. In addition, data display 700D includes a specifics window 724 which provides a user with a means for associating a severity level with a given memory utilization. The memory utilization will typically be the amount of memory in megabytes that an agent is consuming.

The displays shown in FIGS. 6A-D are exemplary in nature and numerous changes can be made to thereto without departing from the spirit of the invention.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above description focused on monitoring memory utilization associated with operating agents and their associated threads, the invention can be modified to also monitor input and output data associated with agents such as that associated with disk input/output data. And, while a series of steps have been described with regard to FIGS. 2, 3A and 3B, the order of the steps may be varied in other implementations consistent with the present invention. Moreover, non-dependent steps may be implemented in parallel if desired.

No element, step, or instruction used in the description of the present application should be construed as critical or essential to the invention unless explicitly described as such. Also, as used herein, the article "a" is intended to include one or more items or elements. Where only one item is intended, the term "one" or similar language is used.

Many alternative embodiments of the present invention are possible in light of the teachings hereinabove. For example, in a first alternative embodiment, values displayed in agent ID 706, of display 700A, may be comprised of links that when clicked on open a new window containing detailed information about the agent. The detailed information can contain parameters associated with the agent, actual source code associated with the agent, security settings and permissions associated with the agent, etc. In addition, clicking on the link may further open a source code debugger to let the user begin debugging the source code associated with a particular problematic agent.

In a second alternative embodiment, the methods of FIGS. 2, 3A and 3B, can be modified so that only agents developed by a certain programmer are identified and monitored before reporting results back to only that programmer. Implementing this embodiment of the invention may be useful to programmers in that they can assess the impact of their code on the system, thus making before and after benchmarking possible with respect to newly developed agents.

The scope of the invention is defined by the claims and equivalents thereof hereinbelow.

The claims should not be read as limited to the described order or elements unless stated to that effect. Therefore, all embodiments that come within the scope and spirit of the following claims and equivalents thereto are claimed as the invention.

What is claimed:

1. A method embodied in a computer system for monitoring memory usage of an agent executing in said computer system, wherein said agent is a software agent comprising at least a portion of a software application, said method comprising:
    starting a resource tracking application for monitoring memory usage of said agent;
    creating a computer-readable data structure for storing information about said agent;
    identifying a process that is currently running on said computer system, and with which said agent is operatively associated, including identifying a plurality of threads of said process that said agent is running on;
    determining, by said resource tracking application, memory usage data for said agent, wherein said memory usage for said agent is determined based on a total memory usage of said plurality of threads;
    storing said memory usage data in said data structure;
    determining, responsive to said memory usage data stored in said data structure, that said memory usage of said agent exceeds a predetermined maximum memory usage threshold; and
    displaying, responsive to said determination that said memory usage of said agent exceeds said predetermined maximum memory usage threshold, a system administrator user interface, said system administrator user interface including an agent identifier uniquely associated with said agent, a recommended solution to address said exceeding of said predetermined maximum memory usage threshold by said agent, and an execute solution user interface object, wherein selecting of said execute solution user interface object by a user causes said recommended solution to be automatically performed.

2. The method of claim 1, wherein said computer-readable data structure is a hash table.

3. The method of claim 2, wherein said determining said process that is currently running further comprises determining that said process is a non-hypertext transport protocol (non-HTTP) process comprising at least one of the set consisting of an electronic mail task, a Web conferencing task, and a customer developed task.

4. The method of claim 3 wherein said determining said process that is currently running further includes:
    creating a thread list for monitoring said plurality of threads;
    producing at least one determined allocation for at least one of said plurality of threads; and
    computing a peak memory usage for said agent using said at least one determined allocation;
    thereby monitoring memory usage by said agent.

5. The method of claim 4 further comprising:
    comparing said peak usage for said agent to a plurality of peak usages associated with a like plurality of other agents executing in said system.

6. The method of claim 5 further comprising:
    computing statistics on said agent and said plurality of other agents; and
    ranking said agent against said plurality of other agents based on said peak usage to produce a ranked list.

7. The method of claim 6 further comprising:
    displaying said ranked list to said user.

8. The method of claim 2, wherein said determining said process that is currently running further comprises determining that said process is an HTTP process comprising an HTTP task.

9. The method of claim 8, wherein said determining said process that is currently running further includes:
    wherein said identifying said plurality of threads of said process said agent is running on includes identifying HTTP threads operating in said system to produce identified threads, each of said HTTP threads further having one of a plurality of agent types associated therewith, at least one of said plurality of agent types including said agent, said agent capable of having agent threads associated therewith;
    generating an agent thread list for facilitating identification of said plurality of agent types by storing information associated therewith; and
    identifying which of said plurality of agent types is operating on each of said HTTP threads.

10. The method of claim 9 further comprising:
    comparing said total memory consumption for said agent to a like plurality of total memory consumptions associated with others of said plurality of agent types.

11. The method of claim 10 further comprising:
    computing statistics on said total memory consumption for said agent and each one of said plurality of total memory consumptions; and
    ranking said agent against said others of said plurality of agent types using said total memory consumption and said plurality of total memory consumptions, respectively, to produce a ranked list.

12. The method of claim 11 further comprising:
displaying said ranked list to said user.

13. The method of claim 1, further comprising:
determining if said agent is running before determining said memory usage.

14. The method of claim 13, further comprising:
determining if said agent is expired; and
processing said information if said agent is expired.

15. The method of claim 1, wherein said data structure further includes information about a plurality of other software agents.

16. The method of claim 15, further comprising:
establishing said maximum memory usage threshold.

17. The method of claim 16, further comprising:
terminating said software agent and those of said plurality of other software agents exceeding said threshold.

18. A computer program product including a memory having machine-readable instructions stored thereon for, when executed, causing a processor to perform a method for identifying memory usage information associated with a software agent operating in a computer system, said instructions comprising:
  instructions for initiating a resource tracking application for monitoring memory usage of said agent;
  instructions for generating a computer-readable data structure residing in computer-accessible memory for storing memory usage data associated with said agent;
  instructions for determining, by said resource tracking application, said memory usage data, wherein said memory usage data is determined based on a total memory usage of a plurality of threads of a process said agent is running on;
  instructions for storing said memory usage data in said computer-readable data structure;
  instructions for determining, responsive to said memory usage data stored in said data structure, that said memory usage of said agent exceeds a predetermined maximum memory usage threshold; and
  instructions for displaying, responsive to said determination that said memory usage of said agent exceeds said predetermined maximum memory usage threshold, a system administrator user interface, said system administrator user interface including an agent identifier uniquely associated with said agent, a recommended solution to address said exceeding of said predetermined maximum memory usage threshold by said agent, and an execute solution user interface object, wherein selecting of said execute solution user interface object by a user causes said recommended solution to be automatically performed.

19. The computer program product of claim 18, said instructions further comprising:
  instructions for storing memory usage information about a plurality of other software agents;
  instructions for processing said memory usage information associated with said agent and said memory usage information about said plurality of other software agents; and
  instructions for generating a rank order list including said information about said agent and said information about said plurality of other software agents.

20. A computer system for monitoring operation of an agent executing in said computer system, wherein said agent is a software agent comprising at least a portion of a software application, said computer system comprising:
  a processor for executing instructions stored in a computer readable memory, said instructions when executed performing the steps of:
    starting a resource tracking application for monitoring memory usage of said agent;
    creating a computer-readable data structure for storing information about said agent;
    identifying a process that is currently running on said computer system, and with which said agent is operatively associated, including identifying a plurality of threads of said process said agent is running on;
    determining, by said resource tracking application, memory usage data for said agent, wherein said memory usage for said agent is determined based on a total memory usage of said plurality of threads;
    storing said memory usage data in said data structure;
    determining, responsive to said memory usage data stored in said data structure, that said memory usage of said agent exceeds a predetermined maximum memory usage threshold; and
    displaying, responsive to said determination that said memory usage of said agent exceeds said predetermined maximum memory usage threshold, a system administrator user interface, said system administrator user interface including an agent identifier uniquely associated with said agent, a recommended solution to address said exceeding of said predetermined maximum memory usage threshold by said agent, and an execute solution user interface object, wherein selecting of said execute solution user interface object by a user causes said recommended solution to be automatically performed.

* * * * *

UNITED STATES PATENT AND TRADEMARK OFFICE
CERTIFICATE OF CORRECTION

PATENT NO.      : 7,636,918 B2  
APPLICATION NO. : 10/824001  
DATED           : December 22, 2009  
INVENTOR(S)     : A. Julie Kadashevich Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1563 days.

Signed and Sealed this

Ninth Day of November, 2010

David J. Kappos  
*Director of the United States Patent and Trademark Office*